(12) United States Patent
Chen et al.

(10) Patent No.: US 11,010,993 B2
(45) Date of Patent: May 18, 2021

(54) CUSTOMIZABLE REPORTING WITH A WEARABLE DEVICE

(71) Applicant: Ford Global Technologies, LLC, Dearborn, MI (US)

(72) Inventors: Yifan Chen, Ann Arbor, MI (US); Padma Aiswarya Kolisetty, Tamil Nadu (IN); Basavaraj Tonshal, Northville, MI (US); Kwaku O. Prakah-Asante, Commerce Township, MI (US); Hsin-Hsiang Yang, Ann Arbor, MI (US); David Anthony Hatton, Orchard Lake, MI (US); Johannes Geir Kristinsson, Ann Arbor, MI (US); Krishnaswamy Venkatesh Prasad, Ann Arbor, MI (US); Hussein F. Nasrallah, Dearborn Heights, MI (US); Tom Nelson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 324 days.

(21) Appl. No.: 15/763,591

(22) PCT Filed: Nov. 4, 2015

(86) PCT No.: PCT/US2015/058944
§ 371 (c)(1),
(2) Date: Mar. 27, 2018

(87) PCT Pub. No.: WO2017/078689
PCT Pub. Date: May 11, 2017

(65) Prior Publication Data
US 2018/0286150 A1    Oct. 4, 2018

(51) Int. Cl.
*G07C 5/08* (2006.01)
*G07C 5/00* (2006.01)
(Continued)

(52) U.S. Cl.
CPC ........... *G07C 5/0816* (2013.01); *B60W 50/14* (2013.01); *G06F 1/163* (2013.01); *G06F 3/0484* (2013.01);
(Continued)

(58) Field of Classification Search
CPC ..... G07C 5/0816; G07C 5/0841; G06F 1/163; B60W 50/14; B60W 2050/146
See application file for complete search history.

(56) References Cited

U.S. PATENT DOCUMENTS 6,734,790 B1 *  5/2004  Hodger ................. B60R 25/102
                                                           307/10.2
8,971,857 B2 *  3/2015  Nishidai ............... H04W 12/06
                                                           455/411
(Continued)

FOREIGN PATENT DOCUMENTS

CN        104656503 A      5/2015
CN        104950728 A      9/2015

OTHER PUBLICATIONS

Notification of Transmittal of International Search Report and Written Opinion from International Searching Authority regarding PCT/US2015/058944 dated Jan. 14, 2016 (13 pages).
(Continued)

*Primary Examiner* — Ramsey Refai
(74) *Attorney, Agent, or Firm* — Brandon Hicks; Bejin Bieneman PLC

(57) ABSTRACT

A device that includes a processor and a memory, the memory storing instructions executable by the processor such that the device is programmed to identify a wearable device and a set of vehicle data from a vehicle. The user device sends a human machine interface (HMI) message to the wearable device. The HMI message is based at least in part on the set of vehicle data.

20 Claims, 4 Drawing Sheets

(51) Int. Cl.
*G06F 3/0484* (2013.01)
*G06F 3/0481* (2013.01)
*B60W 50/14* (2020.01)
*G06F 1/16* (2006.01)

(52) U.S. Cl.
CPC ......... *G06F 3/04817* (2013.01); *G07C 5/008* (2013.01); *G07C 5/0841* (2013.01); *B60W 2050/146* (2013.01)

(56) References Cited

U.S. PATENT DOCUMENTS

| | | | | |
|---|---|---|---|---|
| 8,995,914 | B2* | 3/2015 | Nishidai | H04B 5/00 |
| | | | | 340/426.16 |
| 9,285,228 | B2* | 3/2016 | Lucas | G01C 21/20 |
| 9,499,125 | B2* | 11/2016 | Akay | G07C 9/28 |
| 9,539,901 | B1* | 1/2017 | Clauss | B60K 31/18 |
| 9,815,333 | B2* | 11/2017 | Xie | H04W 4/48 |
| 10,088,844 | B2* | 10/2018 | Attard | G05D 1/0061 |
| 10,112,535 | B1 | 10/2018 | Assam | B60K 35/00 |
| 10,275,143 | B2* | 4/2019 | Nagaraju | G06F 1/1684 |
| 10,633,005 | B2* | 4/2020 | Tonshal | B60W 50/14 |
| 2003/0055537 | A1* | 3/2003 | Odinak | G01C 21/367 |
| | | | | 701/1 |
| 2006/0226973 | A1 | 10/2006 | Catlin | |
| 2007/0001830 | A1* | 1/2007 | Dagci | B60K 31/185 |
| | | | | 340/438 |
| 2008/0167806 | A1* | 7/2008 | Wheeler | G01C 21/26 |
| | | | | 701/532 |
| 2009/0096597 | A1* | 4/2009 | Avery, Jr. | G08G 1/0962 |
| | | | | 340/435 |
| 2009/0192795 | A1* | 7/2009 | Cech | B60R 11/02 |
| | | | | 704/233 |
| 2011/0106365 | A1* | 5/2011 | Miyake | B60K 35/00 |
| | | | | 701/31.4 |
| 2013/0099892 | A1* | 4/2013 | Tucker | G07C 9/00309 |
| | | | | 340/5.61 |
| 2013/0173374 | A1* | 7/2013 | Weiss | G06Q 30/02 |
| | | | | 705/14.27 |
| 2014/0098008 | A1 | 4/2014 | Hatton | |
| 2014/0181710 | A1* | 6/2014 | Baalu | G06F 3/017 |
| | | | | 715/765 |
| 2014/0195108 | A1 | 7/2014 | Schumacher | |
| 2014/0375477 | A1* | 12/2014 | Jain | H04W 4/80 |
| | | | | 340/933 |
| 2015/0127215 | A1 | 5/2015 | Chatterjee | |
| 2015/0149088 | A1* | 5/2015 | Attard | G05D 1/021 |
| | | | | 701/538 |
| 2015/0248214 | A1* | 9/2015 | Gilger | G06F 3/04817 |
| | | | | 715/719 |
| 2016/0050114 | A1* | 2/2016 | John Archibald | G06F 1/3206 |
| | | | | 370/254 |
| 2016/0152180 | A1* | 6/2016 | Kirsch | B60Q 1/52 |
| | | | | 701/36 |
| 2017/0151928 | A1* | 6/2017 | Kang | B60R 25/04 |

OTHER PUBLICATIONS

Chinese Office Action as issued by the Chinese Patent Office dated Apr. 2, 2020 (in English and Chinese).

Chinese Second Office Action as issued by the China National Intellectual Property Administration on Dec. 7, 2020, for related Chinese Patent Application No. 2015800843306. (in Chinese and English).

* cited by examiner

CUSTOMIZABLE REPORTING WITH A WEARABLE DEVICE

CROSS-REFERENCE TO RELATED APPLICATIONS

This application is a national stage of, and claims priority to, Patent Cooperation Treaty Application No. PCT/US2015/058944, filed on Nov. 4, 2015, which application is hereby incorporated herein by reference in its entirety.

BACKGROUND

A wearable device is a computer that is incorporated into items of clothing and/or accessories, e.g., bracelets, pendants, etc., and typically can comfortably be worn on the human body. Generally, wearable devices have some form of communications capability, e.g., Bluetooth or the like, and allow the wearer access to local and global computers via a wired or, usually, a wireless network. Data input and output capabilities are also features of such devices. Examples of wearable devices include watches, glasses, contact lenses, e-textiles and smart fabrics, headbands, beanies and caps, jewelry such as rings, bracelets, and hearing aid-like devices.

DRAWINGS

DESCRIPTION

Introduction

Figure 1:
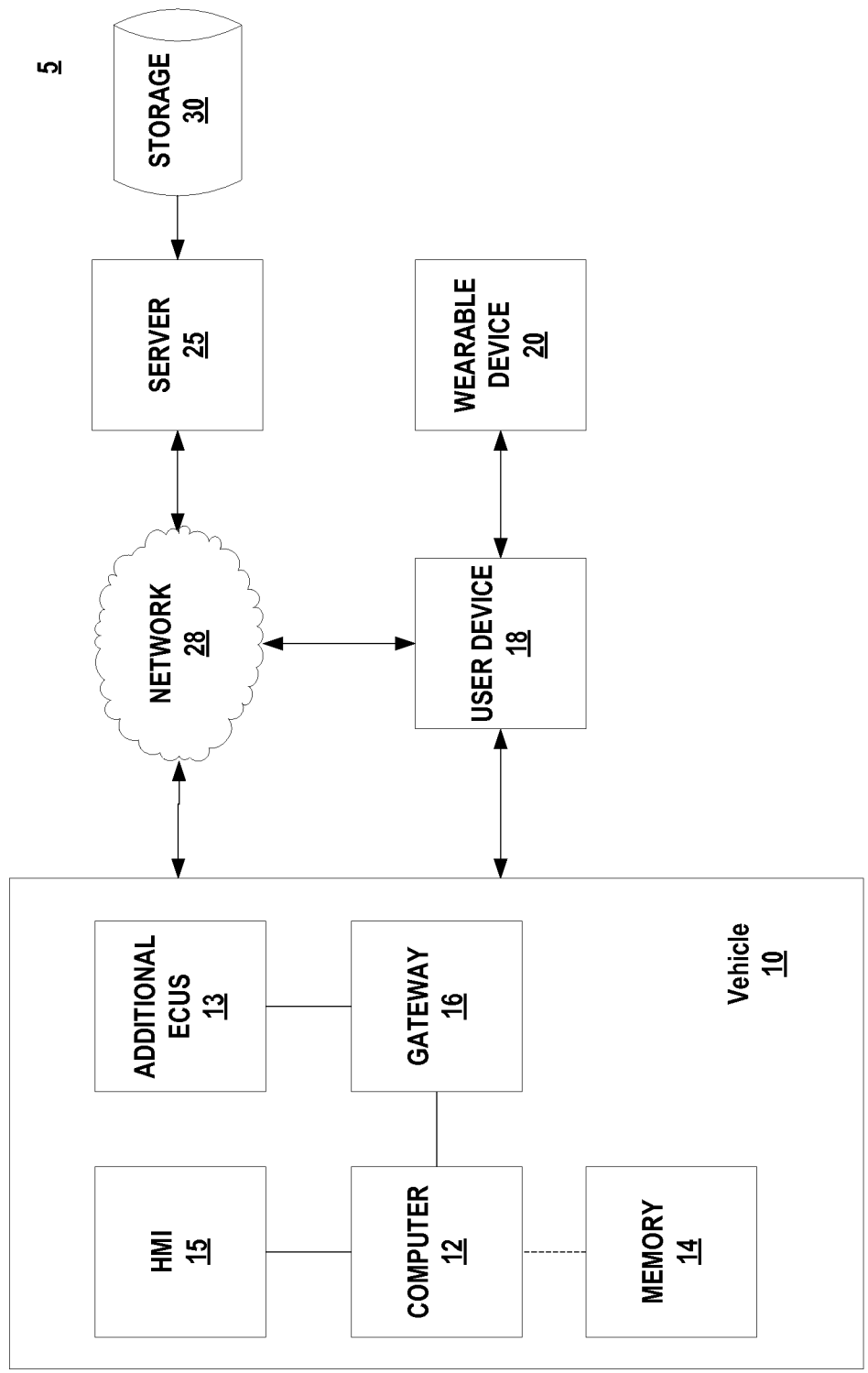
FIG. 1 is a block diagram of an exemplary event and reporting wearable device system.

FIG. 1 is a block diagram of an exemplary event and reporting wearable device system 5. A vehicle 10 includes a computer 12 that communicates through a user device 18 with a wearable device 20, which can be worn by a vehicle 10 occupant, including a vehicle 10 operator. The wearable device 20 is typically a smart watch, but can also be a smartphone, a pair of glasses, a glove, a contact lens, a smart fabric, a headband, a beanie, a cap, a ring, a bracelet, an in-ear device or the like, such as is known for various applications, including acting as external human-machine interface (HMI) to the computer 12. For example, the computer 12 may send a vehicle health status alert to the occupant's wearable device 20 and/or send a text, an email, or the like to the occupants or family members. The user device 18, which may be a smartphone or other mobile computing devices, can act as an intermediary between the vehicle 10 and the wearable device 20. Additionally, vehicle statuses can vary the size and other characteristics of icons or the like on the wearable device 20. For example, graphical images which can represent an app, such as is known, can be displayed as large icons on the wearable device 20 when the vehicle 10 is in motion, making the icon easier to discern.

Exemplary System Elements

Vehicle

The vehicle 10 includes the vehicle computer 12 that includes a processor and a memory 14, the memory 14 including one or more forms of computer-readable media, and storing instructions executable by the processor for performing various operations, including as disclosed herein. For example, the computer 12 generally includes, and is capable of executing, instructions to detect the presence of the user device 18 and the wearable device 20, and can provide to the user device 18 and/or the wearable device 20 messages that alternatively or additionally may be sent to a human-machine interface (HMI) 15 of the vehicle 10 or to a wearable device HMI.

The computer 12 is configured, i.e., includes programming and hardware such as is known, for communicating with one or more servers 25 (the server 25 typically including or being coupled to a data store 30) via a gateway 16 of the vehicle 10. The gateway 16 can be a telematics unit or the like which accommodates sending and receiving information via an external network 28. The wearable device 20, the user device 18, and the vehicle 10 gateway 16 can communicate with each other, as described below, and may include various wired and/or wireless networking technologies, e.g., cellular, Wi-Fi, Bluetooth, Near Field Communication (NFC), wired and/or wireless packet networks, etc. Further, the computer 12 generally includes instructions for exchanging data, e.g., from one or more wearable devices 20 and/or user devices 18 and/or the HMI 15, which may be one or more of an interactive voice response (IVR) system, a graphical user interface (GUI) including a touchscreen or the like, etc.

The vehicle 10 can have additional electronic control units (ECUs) 13 for monitoring and controlling various vehicle 10 electrical and electromechanical systems. The ECUs can be incorporated into the vehicle 10 and provide and request information to and from the occupant via the HMI 15, the wearable device 20, or the user device 18. For example, ECUs 13 can represent a navigation ECU which provides a vehicle navigation system location. Other ECUs can include a safety ECU, a powertrain ECU, and an entertainment ECU, just to name a few. Each ECU 13 can contain a processor and a memory, the memory storing instructions to be executed on the processor to perform each particular ECU's operation(s), as well as instructions to communicate with other ECUs and devices.

Wearable Device

The wearable device 20 is typically a device worn or carried by a user and may be any one of a variety of computing devices which can include a processor, sensors such as an accelerometer, and a memory. The wearable device 20 typically further has radio frequency and/or wired communication capabilities such as are known. A concern arising from use of a wearable device 20 is how long the wearable will operate before needing a battery recharge or replacement. Thus, battery size is an issue with the wearable device 20. If the battery is large, the wearable device may be heavy, awkward to wear, or unsightly. To obtain a reasonable operational time, while incorporating a less obtrusive battery, the wearable device 20 will usually contain a low-power processor and a low-power communications circuit. The low-power communication circuit of the wearable device 20 may only be able to communicate with other devices within a very short range. For example, due to a very low radio frequency transmitter, the wearable device 20 may only be capable of reliably communicating with the occupant's user device 18 when the wearable device 20 is within one meter of the user device 18. Therefore, the wearable device 20 may need to first establish a connection with the user device 18, and the user device 18 may then handle the communications with the vehicle 10 computer 12. In other words, a program executing on the user device 18 permits the user device 18 to act as an intermediary between the wearable device 20 and the vehicle 10 computer 12.

In addition, the wearable device 20 may have a low-power geolocation hardware and software to provide an occupant location. For example, the wearable device 20 can report its location independently of the vehicle 10 navigation location or the user device 18 location. The occupant location can then be used to verify that the wearer of the wearable device 20 is within the vehicle 10 and has not wandered away from the vehicle 10. In one example after a wearable device 20 is not verified to be within, or within a predetermined distance of, a vehicle 10, a location alert message can be sent to a concerned parent or child, e.g., to a user device 18.

The accelerometer is a device within the wearable device 20 that can detect magnitude and direction of the proper acceleration (or g-force), e.g., as a vector quantity, and can be used to sense orientation and acceleration in a known manner. The accelerometer can send an accelerometer value to the user device 18 for use in determining vehicle 10 acceleration and turning. For example, if the wearable device 20 is on the wrist of an operator, the accelerometer value can be used to steer the vehicle 10 using the various accelerometer values the wearable device 20 reports to the user device 18 as the operator manipulates a steering-wheel type device.

Furthermore, the wearable device 20 can be used to supplement and/or replace the HMI 15 of the vehicle 10. The wearable device 20 can exchange, i.e., send and/or receive, messages with the user device 18, and the user device 18 can exchange messages with the vehicle 10 computer 12. For example, the user device 18 can send a query message to the wearable device 20, and the wearer of the wearable device 20 can press a button or provide other input, which will then send a response message to the user device 18, thereby indicating a presence of the wearable device 20 and possibly providing other data. In another example, the mere presence of the wearable device 20 within the vehicle 10 and proximate to the user device 18 can be detected by a communications connection, e.g., the establishment of a Bluetooth connection.

The wearable device 20 can receive alert messages from the user device 18 or the vehicle 10. The alert message can include a communication to indicate where a user can find additional information regarding the alert. For example, the alert message can state that further information can be found regarding the alert on a vehicle HMI screen location, for example, on the alerts page in red text.

The wearable device 20 can receive a list of apps to run and/or icons representing respective apps to display on the wearable device from the user device 18 or the vehicle 10. Furthermore, the user device 18 and/or the vehicle 10 can instruct the wearable device 20 to permit full or limited scrolling of app icons from the list of available app icons, i.e., in a limited scrolling mode a designated subset of the icons would be displayed, e.g., the wearable device 20 could be limited to displaying apps that provide information about the vehicle 10, e.g., speed, heading, cabin temperature, etc. Further for example, the user device 18 can instruct the wearable device 20 to only display vehicle entertainment apps from the list of apps on the wearable device 20 HMI when the vehicle is in motion.

User Device

The user device 18 can be a smartphone, a tablet, or the like with a telecommunications connection to an external cellular network, as well as local network capability. For example, the user device can be connected to a cellular telephone network for voice communications as well as having a data connection to an external network, such as the Internet. The local network capability can be provided by WiFi, Bluetooth, Near Field Communication communications, etc. The user device 18 can include geolocation hardware and software, which allows the user device 18 to obtain positional information and provide a user device 18 location.

The user device 18, typically a mobile device carried by a user, may be any one of a variety of computing devices with a processor and a memory, as well as communications circuitry. For example, the user device 18 may be a portable computer, tablet computer, a smartphone, etc., that includes capabilities for wireless communications using IEEE 802.11, Bluetooth, Bluetooth Low Energy (BLE), and/or cellular communications protocols. Further, the user device 18 may use such communication capabilities to communicate via the network 28 with the vehicle computer 12. Accordingly, the user device 18 may be used to carry out some of the operations herein such as receiving environmental condition data from a server 25, making a determination to alert the driver of an impending storm and possible flooded roadways, and providing and determining an alternative route for the vehicle 10. Further, the user device 18 can be used to supplement and/or replace the HMI 15 of the vehicle 10.

Figure 2:
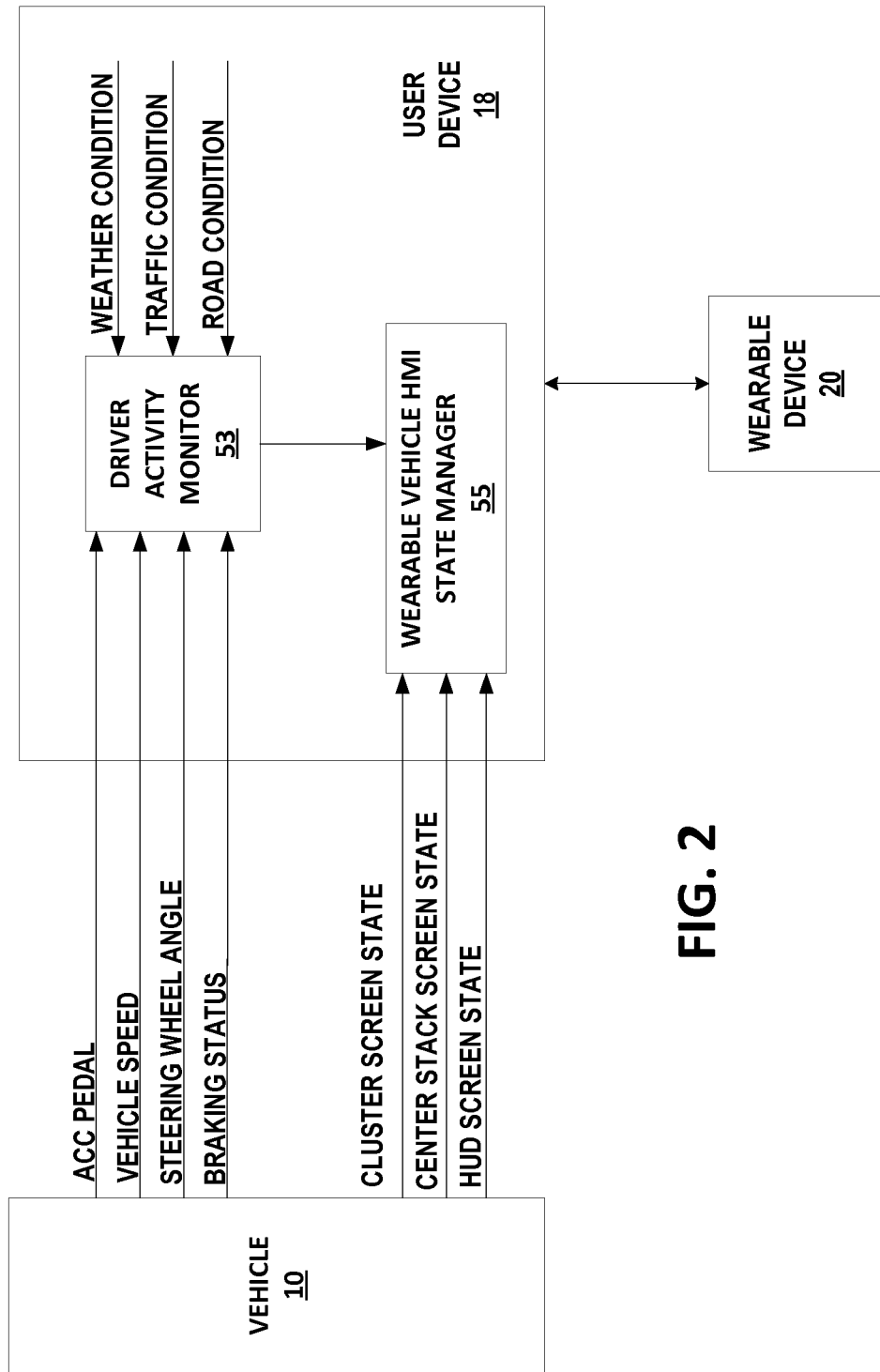
FIG. 2 is a block diagram of an exemplary wearable device of the system of FIG. 1.

FIG. 2 is a block diagram of an exemplary user device 18 intermediating between the vehicle 10 and the wearable device 20. As seen in FIG. 2, the user device 18 can receive external condition information, vehicle 10 status information, etc., and can, based at least in part thereon, send a wearable status message to the wearable device 20. As discussed above, wearable devices can have limited computing and communications abilities. Therefore, software programs, e.g., apps such as are known, permit the user device 18 to act as an intermediary between the vehicle 10 and the wearable device 20. In addition, to acting as an intermediary by filtering, transforming, and/or relaying messages, apps on the user device 18 can act as vehicle 10 monitor. For example, the vehicle 10 can send to the various driver activity signals to the user device 18, such as, an accelerator (ACC) pedal position, a vehicle speed value, a steering wheel angle, etc. The ACC pedal position is typically known as the 'drive by wire' system and will deliver information to the engine control ECU 13 about the accelerator pedal position in addition to the information about the speed at which the driver is pushing on the gas pedal.

The aforementioned driver activity signals permit the computer 12 and/or user device 18 to determine a size of an icon to display on the wearable device 20 or the user device 18. The computer 12 an/or the user device 18 can determine a driver activity index, i.e., a value representing driver activity. Each of the activities can be quantified with a number. For example, if the driver is pressing on the accelerator to go faster, that action can be represented with a first factor driver activity number, which can be relatively higher as compared to the next discussed pedal positions. A midrange number would represent the driver holding a steady speed with the accelerator pedal. Likewise, if the driver is not engaging the accelerator pedal, the driver activity number for the ACC driver activity would be lower.

The vehicle speed can also be a second factor driver activity number, but vehicle speed can also be used to determine the size of a displayed icon on the wearable device 20. In a first example, the faster the vehicle 10 is traveling, the higher the second factor driver activity number. Additionally, in a second vehicle speed related example, the user device 18 and/or the wearable device 20 can display larger icons as the vehicle speed increases, as larger icons are easier to see and may require less time for a wearer to perceive the icon.

An amount a steering wheel is turned is a third factor that may be considered in quantifying driver activity in the driver activity index. The more the steering wheel is turned in one example, the higher the third factor driver activity number. The first, second and third factor driver activity numbers are then aggregated, e.g., added or averaged, to determine an overall driver activity number. For example, the user device 18 ascertains that the ACC pedal position indicates the driver is accelerating the vehicle through ACC pedal engagement, the vehicle 10 speed value is 55 miles per hour, and the steering wheel position is indicating a turn, so the user device 18 can determine that the driver is actively engaged in driving the vehicle, and the user device 18 can suppress notifications to the user device 18 and/or the wearable device 20. More sophisticated methods of determining driver workload while driving can also be used to determine an app icon size and any text associated with the app's display on the wearable device 20. While it is outside the scope of this invention, utilizing a driver workload indicator for the same purchase should be understandable to those who are skilled in the art.

The computer 12 may provide one or more of cluster screen data, center stack screen data, and heads-up display (HUD) data. The cluster screen data is a set of instrument data usually present on the dashboard of the vehicle, e.g. a speedometer and tachometer. The center stack screen data is a set of vehicle control data usually present in the vehicle's center stack, e.g., entertainment, phone, climate control, navigation, etc. The HUD data is a set of HUD data which may be projected upon the windshield in front of the operator, e.g., a current speed limit, a vehicle speed of the vehicle 10, turn-by-turn navigation, etc.

In addition, the user device 18 and/or computer 12 can acquire environmental condition data as it relates to the vehicle 10 and/or a route planned and/or being traversed by the vehicle 10. For example, the user device 18 can request and obtain a set of environmental conditions with regards to weather condition information, traffic condition information, and road condition information. For example, the set of environmental conditions can be requested by the user device 18 from the server 25, which may be on the Internet. The user device 18 can then alert the driver of the environmental conditions either through the user device 18 and/or the wearable device 20.

The network 28 represents one or more mechanisms by which a vehicle 10 computer 12 may communicate with a server 25 and/or a user device 18. Accordingly, the network 28 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN), and/or wide area networks (WAN), including the Internet, providing data communication services.

The server 25 may be one or more computer servers, each generally including at least one processor and at least one memory, the memory storing instructions executable by the processor, including instructions for carrying out various steps and processes described herein. In general, the server 25 may be used for a variety of purposes, e.g., interacting with a vehicle 10 navigational system, providing data used for suggesting a vehicle 10 route and/or attributes thereof. The server 25 may include or be communicatively coupled to a data store 30 for storing data such as route information, potential waypoints, weather and traffic information, etc. Thus, one possible operation of the server 25 is to receive an indication from a vehicle 10 computer 12 via the network 28 that a vehicle 10 occupant is in the vehicle 10, and that the vehicle 10 is on.

Exemplary Process Flows

Figure 3:
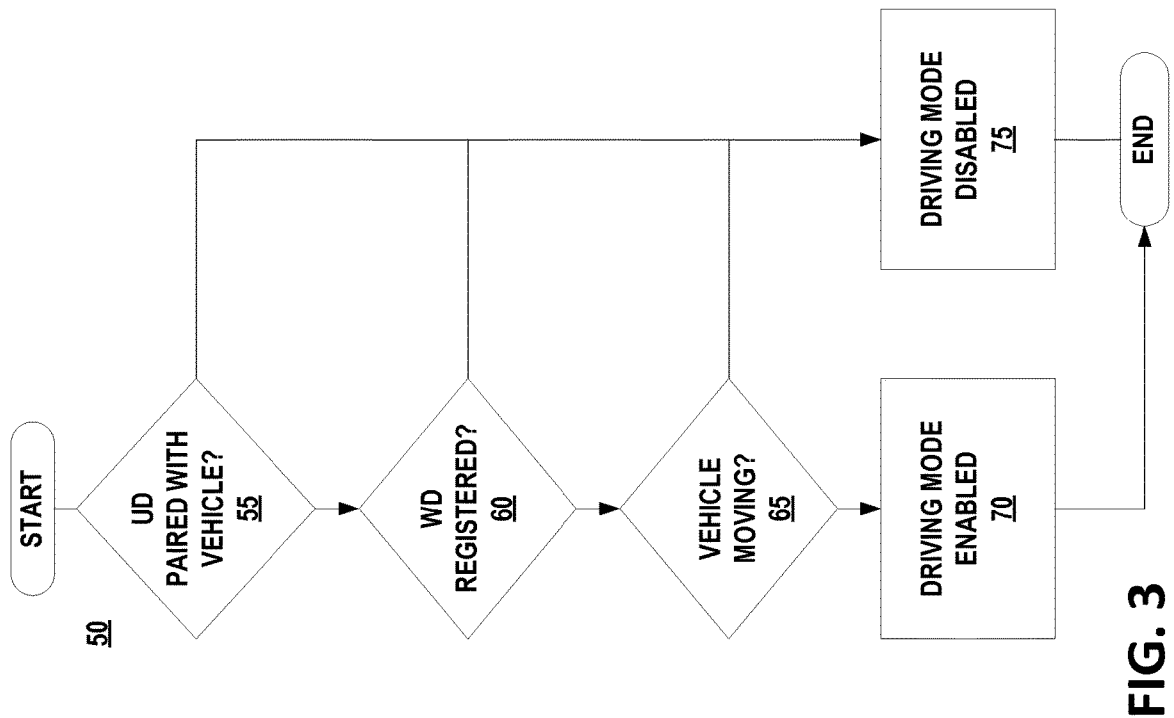
FIG. 3 is a diagram of an exemplary process for determining if a wearer of the wearable device is driving a vehicle.

FIG. 3 is a diagram of an exemplary process 50 for determining if the wearer of the wearable device 20 is driving the vehicle 10.

The process 50 begins in a block 55, in which the user device 18 determines if the user device 18 is paired with the vehicle 10. The pairing can be provided by WiFi, Bluetooth, Near Field Communication communications, etc. If the device 18 is paired with the vehicle 10, next a block 60 is executed; otherwise next a block 75 is executed.

Next in the block 60, a determination is made if the wearable device 20 is registered to the owner of the vehicle 10. If the wearable device 20 is registered to the owner of the vehicle, next a block 65 is executed; otherwise, a block 75 is executed.

Next in the block 65, a determination is made if the vehicle is moving and/or an ignition state is on. For example, a velocity sensor or GPS sensor in the vehicle 10 can send a velocity value to the user device 18. If the vehicle is moving, a block 70 is executed; otherwise, a block 75 is executed.

Next in the block 70, the user device 18 enables driving mode. Following the block 70, the process 50 ends.

In the block 75, which can be executed following the blocks 55, 60, and 65, the user device 18 disables driving mode. Following the block 75, the process 50 ends.

Figure 4:
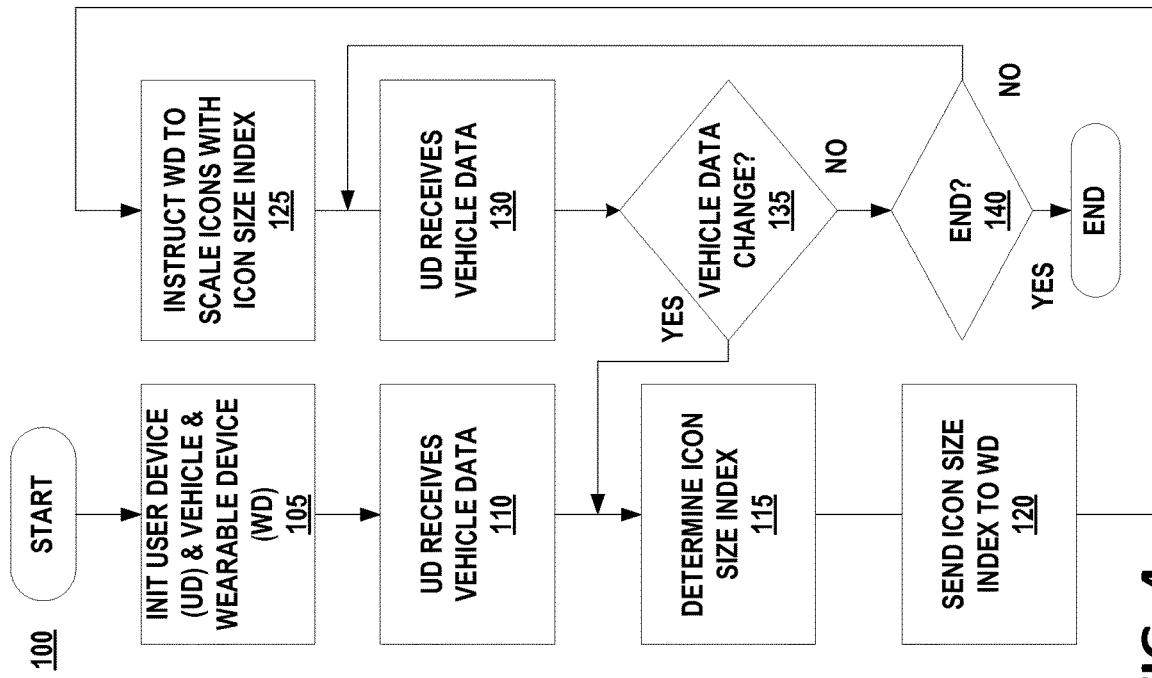
FIG. 4 is a diagram of another exemplary process for initializing the wearable device's communications and determining an icon size to display on the wearable device.

FIG. 4 is a diagram of an exemplary process 100 for initializing the wearable device 20 and determining an icon size to display on the wearable device 20.

The process 100 begins in a block 105, in which the user device 18 exchanges login credentials with the wearable device 20 and with the vehicle 10 computer 12. For example, a user who is wearing the wearable device 20 provides an input to the user device 18, e.g., via a smartphone app or the like, to initiate the exchange of login communications between the wearable device 20 and the user device 18. A second login communication can occur between the vehicle 10 and the user device 18. Thus, when the block 105 is exited, the computer 12 has authenticated one, and typically both, of the user device 18 and the wearable device 20.

Additionally, the user device 18 can send a configuration file to the wearable device 20 and/or the vehicle 10. The configuration can include hard key programming, soft key programming, graphical user interface (GUI) information, a request for wearable device 20 systems status, etc. A hard key is a hardware key, switch, slider, etc., on the wearable device 20 that may be dedicated to a particular operation, e.g., displaying a "home" screen, powering the wearable device 20 one or off, etc. Further for example, a message button on the wearable device 20 can send an emergency request to the user device 18, which can call for emergency services or send a text message or the like (e.g., using simple message service, i.e., SMS) to an emergency services provider, possibly via the server 25, requesting emergency services at a geographical position provided by global positioning system location of the vehicle 10. A soft key is a button flexibly programmable to invoke any of a number of functions rather than being associated with a single fixed function or a fixed set of functions. For example, the soft key of the wearable device 20 can be a "Help, I am lost" key when the wearable device 20 is acting as a driver assist device or the soft key can be a "I am on my way" when the wearable device 20 is in a commuter mode. The GUI of the wearable device 20 can be a LCD display, a LCD display with a touchscreen, or merely a LED light that can flash different patterns and colors to indicate various statuses of messages to the user. For example, the LED can emit a green light when the vehicle 10 systems are operating normally and a red light when there is a problem with a system or subsystem.

Next, in a block 110, the user device 18 receives vehicle data from the vehicle 10 computer 12. For example, the computer 12 may provide data to the user device 18 when the vehicle 10 is turned on, when the vehicle 10 is moving, a position of an accelerator pedal (or change thereof), indicating a vehicle speed (or change thereof), indicating a steering-wheel angle (or change thereof), a global positioning system location, a global positioning system waypoint position, etc.

Next, in a block 115, which can also be executed following a block 135, the computer determines an icon size index from whether driving mode is enabled or disabled (e.g., as determined by the process 50) and/or the vehicle speed. For example, if the vehicle is stopped, the icon size index can have a value of one and the icon displayed on the wearable device 20 will be its default size. In this case, an icon size index could be one, indicating no scaling. If the vehicle 10 is moving at 50 kilometers per hour and driving mode is enabled, the icon size index can have a value of two and the icon displayed on the wearable device will be twice its default size.

Next, in the block 120, the computer 12 sends the icon size index to the wearable device 20.

Next, in the block 125, the computer 12 sends an instruction to the wearable device 20 to display icons on the wearable device 20 according to a scaling indicated by the icon size index value.

Next, in the block 130, which can follow the block 125 but also can be executed following a block 140, the user device 18 receives the vehicle data from the vehicle 10 computer 12.

Next, in the block 135, a determination is made if the vehicle data has changed from the previous values. If the vehicle data has not changed, next a block 140 is executed; otherwise, the process 100 returns and executes in the block 115.

In the block 140, a determination is made if the process 100 is complete. If the process 100 is complete, the process 100 ends; otherwise, next the block 130 is executed.

Figure 5:
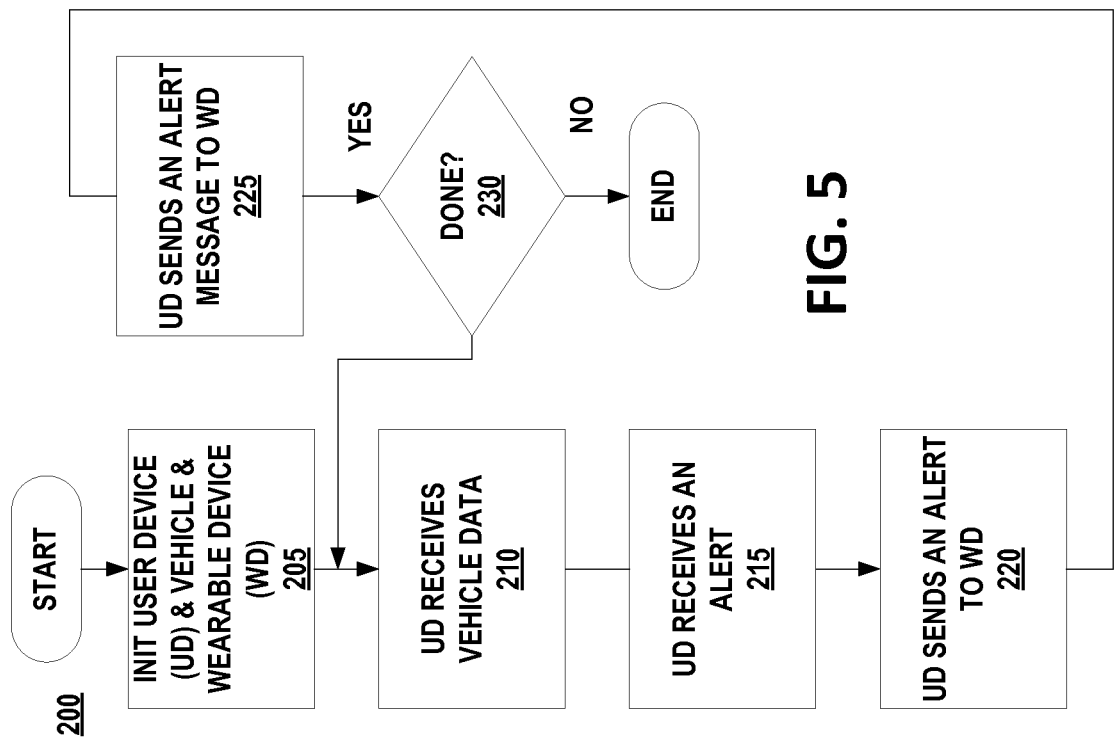
FIG. 5 is a diagram of another exemplary process for messaging the wearable device.

FIG. 5 is a diagram of another exemplary process 200 for messaging the wearable device 20.

The process 200 begins in a block 205, which is similar to the block 105.

Next, in a block 210, which can follow the blocks 205 or 230, the vehicle 10 computer 12 can report any occurrences of events to the computer of the user device 18. For example, an event can be the vehicle 10 detecting a critical engine condition, e.g., a failure of a fuel injector, an electrical problem with a hybrid electric motor, etc. The event can also include information embedded in an error message for the vehicle 10 operator to look for more detailed information about the problem. An event could be, by way of further example, triggered by the weather condition information, the traffic condition information, and the road condition information received by the user device 18. For example, the user device 18 may have received information that a major accident is blocking the road two miles ahead of the vehicle 10.

Additionally, the events can be prioritized and handled accordingly; e.g., there can be three levels of priority alerts which are based upon events or triggers for the wearable device 20 or user device 18. A priority one alert is a critical alert, such as those directly related to safety (e.g., imminent collision); for example, the user device 18 will send the alert to the wearable device 20 and request immediate delivery through, e.g., vibrotactile feedback. This is an example of delivering redundant alerts through the vehicle HMI 15 and the wearable device 20.

A priority two alert is an urgent alert, such as road hazard requiring activation of traction control or certain engine troubles requiring services; for example, the user device 18 will send the alert to the wearable device 20 through, e.g., both audio and vibrotactile feedback, and provide a direct access button on the wearable device 20 to open up a window for more information on a vehicle 10 HMI 15. Moreover, the wearable HMI can offer to turn on the traction control automatically for the operator 10. A priority three alert is a low-priority alert, for example, a refuel reminder, and the user device 18 will not send any message to the wearable device 20.

Similarly, when the user device 18 receives a notification from the server 25 or the Internet, the wearable device 20 decides what to do with the notification based on the alert priority. For example, with a user device 18 priority one alert, which can contain critical notification, such as notification about severe weather, road accidents, an expected text message, etc., the user device 18 will request both the vehicle 10 and the wearable device 20 to deliver the notification graphically (text on vehicle HMI 15 screen) and via audio and/or haptic feedback on the wearable device 20. For a user device 18 priority two alert, which has an important notification such as a fast-approaching toll station, the user device 18 will request only the wearable device 20 to deliver the notification, graphically and/or via audio and/or haptic feedback. A wearable device 20 priority three alert is a low-priority alert, such as a repeated SMS message, a new bulletin, etc. The user device 18 will not send any message to the wearable device 20 or the vehicle 10 HMI 15.

Next, in a block 215, the user device 18 parses the vehicle 10 data and any other data the user device 18 has received and determines if any data element of the data warrants a message to the wearable device 20. For example, the vehicle 10 may have experienced a minor issue with a passive restraint device in a seat where no one is sitting. This type of event would not cause a message to be sent. However, for example, a message that would need to be immediately sent to the wearer of the wearable device 20 can be, such as when the vehicle 10 sends a possible airbag malfunction message to the user device 18.

Similarly, the user device 18 can be programmed with a preset message through a programmable graphical user interface (GUI). The GUI can be on the vehicle 10 HMI 15, the user device 18, the wearable device 20, or on a network computer (not shown) connected to the network 28. For example, the preset message can be enabled to allow an amber alert message received by the user device 18 or by the vehicle 10 telematics unit and forwarded to the user device 18 to be sent to the wearable device 20. The user device 18 would receive the amber alert notification and determine if the amber alert messages are enabled. If the amber alert messages are enabled, the user device will send a message and a message to the user device 18 as described below.

Next in a block 220, the user device 18 sends the message to the wearable device 20. For example, the message can be an audible alert, a haptic vibration, and/or an on-screen message on the wearable device 20 display.

Next in a block 225, the user device 18 sends the message to the wearable device 20 based upon the event, and the message can include details of the event. For example, the event could be a possible airbag malfunction event or an amber alert event as mentioned above.

Next, in a block 230 the computer of the user device 18 determines whether the process 200 is complete. If so, the process 200 ends; otherwise, the process 200 returns to the block 210.

Figure 6:
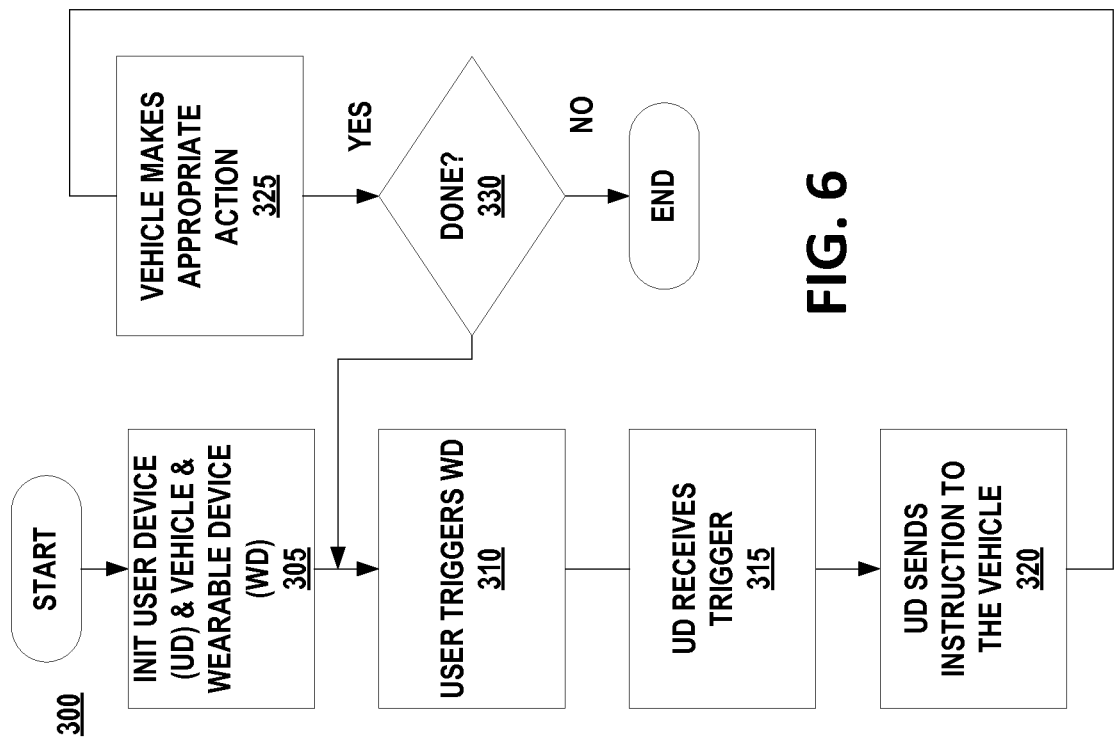
FIG. 6 is a diagram of another exemplary process for triggering an instruction to a vehicle computer.

FIG. 6 is a diagram of another exemplary process 300 in which the wearable device 20 sends a trigger message to the user device 18 and then the user device 18 sends an instruction to the vehicle 10 computer 12.

The process 300 begins in a block 305, which is similar to the blocks 105 and 205.

Next, in a block 310, which can follow the blocks 305 or 330, the wearable device 20 sends a trigger message to the user device 18. The wearer of the wearable device 20 can initiate the trigger message through, for example, pressing a button on the wearable device 20, swiping a finger across the screen of the HMI, speaking a voice command, using the wearable device 20, and/or simply having the wearable device 20 in the proximity of the vehicle 10 to initiate a vehicle cabin preparation message. The trigger message, for example, can indicate to configure the vehicle 10 for a wearable device user's (i.e., wearer's) use according to a wearer preference profile, e.g., to unlock the doors, to set the driver's seat and climate control to the wearer's liking, and to play a certain station with the entertainment center.

Next, in a block 315, the user device 18 receives and parses the trigger message. Continuing with the above example, the user device 18 determines that the wearer has sent the cabin preparation message. The user device 18 can retrieve the wearer preference profile from memory and send the wearer preference profile to the vehicle 10 computer 12. Alternatively, the user device 18 can send only a wearer's identification to the vehicle 10, in which case the computer 12 of the vehicle can retrieve from its memory the wearer preference profile.

Next in a block 320, the user device 18 sends the wearer preference profile to the vehicle 10.

Next in a block 325, the vehicle 10 receives the wearer preference profile and configures the vehicle 10 accordingly, e.g., positions seats, sets a climate control system, actuates an entertainment system by selecting and playing a radio station, etc.

Next, in a block 330 the computer of the user device 18 determines whether the process 300 is complete. If so, the process 300 ends; otherwise, the process 300 returns to the block 310.

Conclusion

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Computing devices such as those discussed herein generally each include instructions executable by one or more computing devices such as those identified above, and for carrying out blocks or steps of processes described above. For example, process blocks discussed above are embodied as computer-executable instructions.

Computer-executable instructions may be compiled or interpreted from computer programs created using a variety of programming languages and/or technologies, including, without limitation, and either alone or in combination, Java™, C, C++, C#, Visual Basic, Java Script, Python, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A device that includes a processor and a memory, the memory storing instructions executable by the processor such that the device is programmed to:
   identify a wearable device separate from the device;
   identify a set of vehicle data from a vehicle separate from the device;
   send a human machine interface (HMI) message to the wearable device, wherein the HMI message is based at least in part on the set of vehicle data; and
   send a configuration file to at least the wearable device and to the vehicle, wherein the configuration file includes at least one of hard key programming, soft key programming, or graphical user interface information.

2. The device of claim 1, wherein the set of vehicle data includes the at least one of an accelerator pedal position, an ignition state, a vehicle speed, a vehicle health status, and a steering-wheel angle of a vehicle.

3. The device of claim 1, further programmed to:
   receive a response message from the wearable device, wherein the response message is initiated by an input to a HMI of the wearable device.

4. The device of claim 1, further programmed to:
   receive at least one of a cluster screen data, center stack screen data, and heads-up display (HUD) data;
   send the at least one of the cluster screen data, the center stack screen data, and the HUD data to the wearable device; and
   instruct the wearable device to display at least one of the cluster screen data, the center stack screen data, and the HUD data on the wearable device.

5. The device of claim 1, further programmed to:
   receive a cabin preparation message from the wearable device; and
   send the cabin preparation message to the vehicle.

6. The device of claim 1, further programmed to:
   identify a priority of an alert; and
   based on part of the priority of the alert, send an alert message to the wearable device.

7. The device of claim 6, further programmed to allow a user to at least initiate or acknowledge the alert message.

8. The device of claim 6, wherein the alert message includes at least a haptic vibration, an audible alert, and a screen message to the HMI of the wearable device.

9. The device of claim 8, wherein the screen message includes at least a vehicle HMI screen location.

10. A method, comprising:
    identifying a wearable device;
    identifying a set of vehicle data from a vehicle;
    sending a human machine interface (HMI) message to the wearable device, wherein the HMI message is based at least in part on the set of vehicle data; and
    sending a configuration file to at least the wearable device and to the vehicle, wherein the configuration file includes at least one of hard key programming, soft key programming, or graphical user interface information.

11. The method of claim 10, wherein the set of vehicle data includes the at least one of an accelerator pedal position, an ignition state, a vehicle speed, a vehicle health status, and a steering-wheel angle of a vehicle.

12. The method of claim 10, further comprising receiving a response message from the wearable device, wherein the response message is initiated by an input to a HMI of the wearable device.

13. The method of claim 10, further comprising:
    receiving at least one of a cluster screen data, center stack screen data, and heads-up display (HUD) data;
    sending the at least one of the cluster screen data, the center stack screen data, and the HUD data to the wearable device; and
    instructing the wearable device to display at least one of the cluster screen data, the center stack screen data, and the HUD data on the wearable device.

14. The method of claim 10, further comprising:
    receiving a cabin preparation message from the wearable device; and
    sending the cabin preparation message to the vehicle.

15. The method of claim 10, further comprising:
    identifying a priority of an alert; and
    based on the priority of the alert, sending an alert message to the wearable device.

16. The device of claim 1, further programmed to determine an icon size index from a speed of the vehicle, and send the icon size index to the wearable device, wherein the wearable device displays icons on the wearable device according to a scaling indicated by a value of the icon size index.

17. The device of claim 1, further programmed to determine an icon size index from whether a driving mode of the vehicle is enabled or disabled, and send the icon size index to the wearable device, wherein the wearable device displays icons on the wearable device according to a scaling indicated by a value of the icon size index.

18. The device of claim 1, wherein the configuration file includes hard key programming.

19. The device of claim 1, wherein the configuration file includes soft key programming.

20. The device of claim 1, wherein the configuration file includes graphical user interface information.

* * * * *